Figure 1:
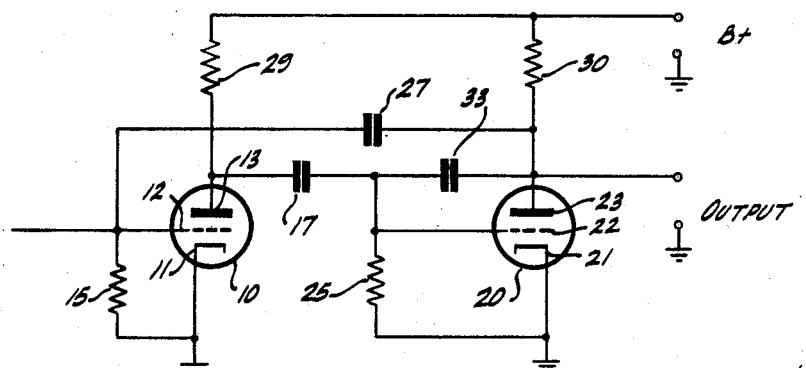

Nov. 5, 1957   R. G. HESTER   2,812,438
MULTIVIBRATOR LINEAR TIME BASE GENERATOR
Filed Aug. 3, 1954

INVENTOR.
ROBERT G. HESTER,
BY
Henry Heyman
ATTORNEY.

United States Patent Office 2,812,438
Patented Nov. 5, 1957

2,812,438

MULTIVIBRATOR LINEAR TIME BASE GENERATOR

Robert G. Hester, Pacoima, Calif., assignor to Hughes Aircraft Company, Culver City, Calif., a corporation of Delaware Application August 3, 1954, Serial No. 447,489

1 Claim. (Cl. 250—36)

This invention relates to sweep generators, and more particularly to a multivibrator which generates a linear timing waveform heretofore unobtainable with multivibrators previously known in the art.

Heretofore, multivibrators using an R–C differentiator have been associated with exponential timing waveforms. Where a linear timing waveform is wanted, multivibrators have been inadequate because only a small portion of the exponential timing waveform could be used and the available sweep time is thus limited. The alternative has been to use a so-called "Miller-type sweep generator," see vol. 19, ch. 5, page 195, of M. I. T. Radiation Laboratories Series, titled Waveforms, published by McGraw-Hill of New York in 1949 and ch. 9, page 158, of Time Bases by Puckle, published by Wilen & Sons of New York in 1951.

In accordance with the present invention it has been found that a multivibrator can be made to produce a linear timing waveform previously produced by Miller-type sweep generators. The improved multivibrator is obtained by adding a capacitor to the usual multivibrator circuit. This capacitor is connected between the anode and control grid of one of the usual cross-coupled triodes included in the multivibrator. The insertion of the additional capacitor results in a linear decrease in the anode potential of this triode while it is conducting, whereas heretofore the voltage waveform at the anode has been rectangular in shape. Further, all the normal advantages in connection with the use of a multivibrator are still obtainable; for example, it may be free-running, synchronized, etc.

Accordingly, it is a prime object of this invention to provide an improved multivibrator which is capable of producing a highly linear waveform.

It is still another object of this invention to provide a multivibrator which produces a highly linear waveform yet retains the flexibility of utilization inherent in the multivibrator.

The above enumerated objects and other objects of the invention will become apparent from the following description taken in conjunction with the accompanying drawings made a part of this specification. In the drawings:

Fig. 1 is a schematic diagram of a preferred embodiment of the invention; and

Figure 2A:
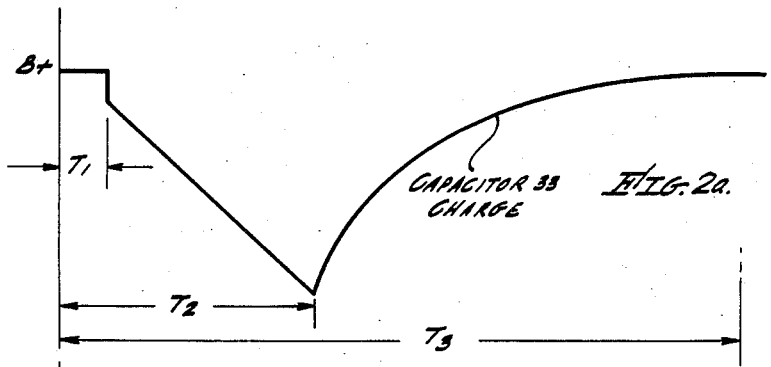
Figure 2B:
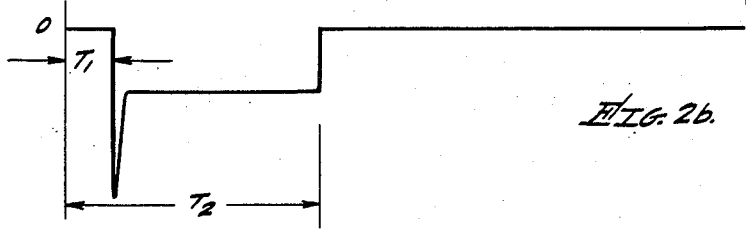
Figure 2C:
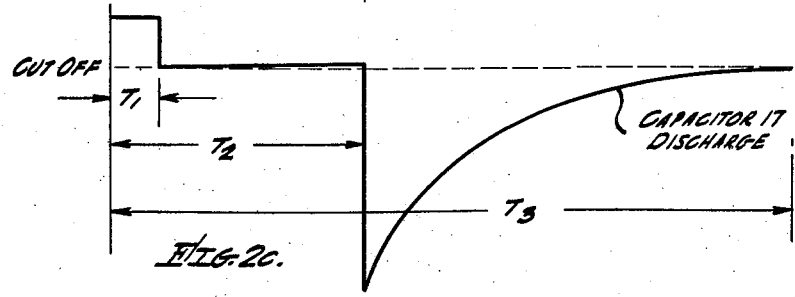

Figs. 2(a), 2(b), and 2(c) are graphs of waveforms useful in the operation of the circuit shown in Fig. 1.

Referring to Fig. 1, a free-running multivibrator includes a first electron discharge device, such as a triode 10, having a grounded cathode 11, a control grid 12, and an anode 13. A grid leak resistor 15 is connected between control grid 12 and cathode 11. A capacitor 17 couples triode 10 to a second electron discharge device, such as triode 20, having a grounded cathode 21, a control grid 22, and an anode 23. Coupling capacitor 17 is connected between the anode 13 of triode 10 and the control grid 22 of triode 20. A grid leak resistor 25 is connected between control grid 22 and cathode 21. A feedback capacitor 27 is connected between the anode 23 of triode 20 and the control grid 12 of triode 10. Load resistors 29 and 30 are connected between a source of positive potential B+ (not shown), and the anodes 13 and 23 of triodes 10 and 20, respectively.

The circuit thus far described is a conventional multivibrator with which an exponential waveform is obtained at control grid 22 or a rectangular waveform at plate 23. The improvement taught by the present invention resides in the provision of a feedback capacitor 33 connected between the anode 23 and the control grid 22 of triode 20. Preferably, the capacitance of capacitor 33 is less than that of capacitor 27. How this improves the operation to achieve the desired results will now be more clearly explained by the use of the figures shown in Figs. 2(a)–2(c).

Initially, at time $T_1$, as shown in Fig. 2(a), it will be assumed that no plate current is flowing in tube 20, the grid of that tube being beyond the cut-off voltage. The negative grid voltage resulted from the charging of capacitor 17 in a manner to be more fully explained later. Since this charge must leak off through resistor 25, the grid voltage does not remain negative indefinitely, but tends to return to zero as the capacitor discharges. Under these conditions, the anode 23 of triode 20 is substantially at the source potential, B+, and the voltage at its grid 22 is rising toward ground potential. As soon as the grid voltage rises above cut-off, denoted as time $T_1$, plate current begins to flow in triode 20. The voltage at anode 23 suddenly decreases a limited amount, as shown in Fig. 2(a), the decrease being transmitted by capacitor 33 to control grid 22 to cause a reduction in the rate of rise of the voltage at control grid 22 towards ground.

Reducing the rate of rise of the grid potential causes the plate current to be reduced, which in turn is reflected in a reduced rate at which the anode potential is decreasing. The action is cumulative, the feedback voltage and the voltage due to the discharge of capacitor 17 combining to keep the net change in voltage across resistor 25 small, as shown in Fig. 2(c), between time $T_1$ and $T_2$. The net result is that the anode potential decreases during this time interval in an extremely linear manner, as shown in Fig. 2(a), until plate saturation is reached.

While this is occurring, the linear decrease in anode voltage is being differentiated by capacitor 27 and resistor 15, and the resultant constant voltage, shown in Fig. 2(b), is applied to control grid 12 of triode 10. The sudden decrease in voltage at anode 23 at time $T_1$ results in the spike appearing at grid 12. The voltage at control grid 12 is of sufficient amplitude to maintain triode 10 well below cut-off during the linear decrease in anode potential of triode 20.

At time $T_2$ plate saturation is reached by triode 20, and a further decrease in anode potential is impossible. This results in the removal of the negative voltage at the control grid 12 permitting triode 10 to conduct. The resultant decrease in anode potential of triode 10 is applied by capacitor 17 to control grid 22, and is of sufficient amplitude to cut-off triode 20.

Capacitor 17 now commences to discharge through resistors 25, 29 with tube 20 remaining cut-off until the voltage across resistor 25 goes above its cut-off potential. During this discharge interval, as shown in Fig. 2(a) between time $T_2$ and $T_3$, the anode side of capacitors 33 and 27 is being charged exponentially to the source potential. When the voltage across the resistor 25 goes above the cut-off potential, as shown in Fig. 2(c), triode 20 commences to conduct and to regulate its own plate current by virtue of capacitor 33, as heretofore described, and the cycle is repeated.

Though the invention has been described as free-running, it is obvious that, as with most multivibrators, it may be synchronized, pulsed, gated, etc., depending upon the value and circuit components selected. One practical embodiment of the improved generator of this invention comprised the following values for the electronic components:

Resistors:
| | | |
|---|---|---|
| 15 | ohms | 510,000 |
| 25 | do | 2,200,000 |
| 29 | do | 220,000 |
| 30 | do | 100,000 |

Capacitors:
| | | |
|---|---|---|
| 17 | microfarads | .01 |
| 27 | do | .0001 |
| 33 | do | .001 |

Triodes 10, 20 _____ 12AT7

What is claimed is:

A sweep generator to develop a linear sweep for a predetermined time and at a predetermined repetition rate, said generator comprising: a first electron discharge device having at least an anode, a cathode and a control grid; a second electron discharge device having at least an anode, a cathode and a control grid; a first capacitor, said first capacitor being connected between the anode and control grid of said second electron discharge device, said first capacitor coupling the anode voltage to the control grid and providing a feedback connection therebetween; a first resistor, said first resistor being connected between the control grid and cathode of said first electron discharge device; a second capacitor, said second capacitor being connected between the anode of said second electron discharge device and the control grid of said first electron discharge device, said second capacitor and said first resistor cooperating to differentiate the decrease in voltage on the anode of said second electron discharge device and to apply the differentiated voltage to the control grid of said first electron discharge device; a third capacitor, said third capacitor being connected between the anode of said first electron discharge device and the control grid of said second electron discharge device and coupled to said first capacitor; a second resistor, said second resistor being connected between the control grid and the cathode of said second electron discharge device, said second resistor and said third capacitor cooperating to apply any change in voltage on the anode of the first electron discharge device to the control grid of the second electron discharge device to cut off said second electron discharge device, said first capacitor having a value of capacitance so selected in comparison to the capacitance of the third capacitor that a desired linear rate of change of voltage is produced at the anode of said second electron discharge device and a constant cut-off voltage is concurrently produced at the control element of the first electron discharge device; a source of positive potential; and load means, said load means being connected between said source of positive potential and the anodes of said first and second electron discharge devices.

References Cited in the file of this patent

UNITED STATES PATENTS

| | | |
|---|---|---|
| 2,070,647 | Braaten | Feb. 16, 1937 |
| 2,248,975 | Faundell | July 15, 1941 |
| 2,549,764 | Bartels | Apr. 24, 1951 |
| 2,695,962 | Nibbe | Nov. 30, 1954 |

FOREIGN PATENTS

| | | |
|---|---|---|
| 535,778 | Great Britain | Apr. 22, 1941 |